United States Patent Office 2,763,643
Patented Sept. 18, 1956

2,763,643

AZACYCLOHEPTANE COMPOUNDS AND METHODS FOR PREPARING THEM

Richard F. Tislow, Richard de Vere Huber, and Julius Diamond, Philadelphia, Pa., assignors to American Home Products Corporation, New York, N. Y., a corporation of Delaware No Drawing. Application September 3, 1954,
Serial No. 454,195

9 Claims. (Cl. 260—239)

This invention relates to azacycloheptane compounds and more particularly to bis-quaternary salts comprising said heterocyclic rings.

The compounds of the invention fall within the following general formula:

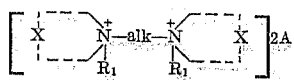

wherein

represents an azacycloheptane ring, $R_1$ represents a lower alkyl, preferably methyl, "alk" indicates a divalent alkylene radical of 4 to 12 carbon atoms and A stands for a pharmacologically non-toxic anion. Suitable salts of the free bases may comprise the bromides, iodides, nitrates, sulphates or salts of the lower aliphatic carboxylic acids. Actually any acid may be used which is known to be pharmacologically safe.

With regard to the azacycloheptane ring represented above, it may be more specifically illustrated by the structure

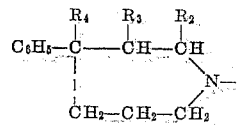

wherein $R_2$ and $R_3$ stand for hydrogen or a lower alkyl, while $R_4$ represents either hydrogen, cyano, —COO·lower alkyl, —COO·alkali metal, —CO·lower alkyl, —CONH$_2$, —COOH or —O—CO·lower alkyl.

The compounds of the invention are pharmacologically useful in the veterinary or human field in that they have been found to possess curare-like, musicle-relaxing action among other pharmacological actions. Thus, in compounds where $R_4$ represents hydrogen, a ganglionic stimulating action has also been noted. Compounds showing the strongest curare-like action are those where $R_2$ and $R_3$ stand for hydrogen with $R_4$ representing an ester of the —COO·lower alkyl type, and with the alkylene chain having from 4 to 10 carbon atoms.

The compounds may be prepared by heating the azacycloheptane with an alkylene dihalide preferably using a molar ratio of at least 2:1 azacycloalkane to halide.

It has been found that substantial yields may be achieved if the reaction takes place in a solvent and if the solvent medium is highly polar, having a high dielectric constant or dipole moment under standard conditions (20° C.) of about 2.5 Debye units or greater. The dielectric constant should be about 10 (epsilon) or greater and preferably from about 15 to 40 when measured under standard conditions. Additionally the highly polar solvent should have a boiling point above about 70° C. since the reaction goes best and with the greatest yield within the range of about 70° to 100° C. although the reaction will take place within the range of about 25° to 120° C. Examples of preferred solvents are the nitro and nitrile compounds such as nitrobenzene, nitromethane, nitroethane, 1-nitropropane, acetonitrile and benzonitrile.

If the precipitate that forms from the aforesaid reaction is large, the reaction mixture is chilled with ice-water and then treated with a large volume of relatively low boiling ketone, such as acetone or methyl-ethylketone. If little or no precipitate forms, the reaction mixture is treated with a relatively non-polar solvent such as diethylether, heptane or benzene. Surprisingly, an excellent granular product is obtained by adding the reaction mixture gradually to the non-polar solvent, rather than using the reverse procedure.

The desired product obtained as a precipitate is separated from the reaction mixture, washed with non-polar solvent and dried. If further precipitation is sought, the product may be recrystallized from a mixture of a low boiling alcohol of 1 to 5 carbon atoms and low boiling ketone having 3 to 6 carbon atoms, ether, or hydrocarbon solvent being used additionally if the crystallization takes place too slowly.

The azacycloheptane reactant may be prepared as disclosed in Diamond and Bruce Patent No. 2,666,050, dated Jan. 12, 1954, and in their applications Ser. Nos. 400,136 and 403,448 filed respectively on Dec. 23, 1953 and Jan. 11, 1954. Application Ser. No. 400,136 teaches the method for making 4-arylazacycloheptanes having also in the 4-position either hydrogen, —CONH$_2$, —COOH, or —COO·alkali metal.

To make the 4-arylazacycloheptanes of application Ser. No. 400,136 one utilizes the corresponding 4-aryl-4-cyanoazacycloheptane whose general formula is shown in the above mentioned patent and which is made as shown by reactions 1, 2 and 3 therein. The cyano substituent is hydrolyzed by known procedures to form the amide or —CONH$_2$ radical. Alternatively, the amide may be formed by reacting the 4-cyano compound with a higher alcohol and a base, as for example heptanol and potassium hydroxide at a temperature of about 160° C.

To obtain the carboxylic acid radical, —COOH in place of the cyano group, the reaction with alcohol and base as above described is carried out at a higher temperature, in the neighborhood of 200° C. If the 4-amide compound is reacted with an alkali metal hydroxide alone, the alkalimetal carboxylic acid salt will form. Should one merely wish to remove the cyano substituent, the 4-cyano compound may be heated at about 250° C. in the presence of alkali metal hydroxide and water. By another procedure, one may decyanate the azacycloheptane by reacting the corresponding 4-cyano compound with an alkali-metal amide in the presence of an inert organic solvent of the hydrocarbon type such as hexane or benzene, or their higher homologues.

The 4-acyloxy azacycloalkanes of application Ser. No. 403,448 may be prepared from the corresponding 4-cyanocompounds of Patent No. 2,666,050 described previously. Thus, the cyano compound is subjected to decyanation as above described and the decyanated product is then reacted with a tetra lead salt of a lower aliphatic carboxylic acid, with the reaction being carried out in the presence of the corresponding aliphatic acid. As an example, the reaction to replace the cyano radical with the acyloxy radical —O—CO—CH$_3$ is carried out using lead tetra-acetate in the presence of acetic acid as a solvent, the temperature of reaction being in the neighborhood of about 80 to 85° C.

The following examples disclose the invention in specific detail. It should be clearly understood that the examples are merely for illustration and are not to be construed as limitative of the invention.

EXAMPLE 1

*1,4-bis-(4-cyano-1-methyl-4-phenyl-azacycloheptane-onium)-tetramethylene dibromide*

4-cyano-1-methyl-4-phenyl - azacycloheptane, 2.6 g. (0.012 mole), 1,4-dibromobutane, 1.1 g. (0.0050 mole), and nitromethane, 8 ml., were mixed and heated at 100° C. for 6 hours. The product was precipitated by the addition of dry ether. After trituration with ether, it was crystallized by dissolving in a hot mixture of acetone and methanol (minimum), evaporating and cooling. The desired product melted at 226–28° C. (decomposition).

*Analysis.*—$C_{32}H_{44}N_4Br_2$:

|  | Nitrogen, percent | Bromine, percent |
|---|---|---|
| Calcd | 8.68 | 24.8 |
| Found | 8.96 | 24.8 |

EXAMPLE 2

*1,5-bis-(4-cyano-1-methyl-4-phenyl-azacycloheptane-onium)-pentamethylene dibromide*

4-cyano-1-methyl-4 - phenyl - azacycloheptane, 2.6 g. (0.012 mole), 1,5-dibromopentane, 1.2 g. (0.0050 mole), and nitrobenzene, 8 ml., were mixed and heated at 100° C. for 6 hours. After cooling in an ice-bath, acetone, 15 ml., was added with stirring. The solid, after filtering, was triturated well with dry ether and dried at 50° C. The desired product melted at 205–210° C. It may be recrystallized from acetone and methanol (minimum).

*Analysis.*—$C_{33}H_{46}N_4Br_2$:

|  | Nitrogen, percent | Bromine, percent |
|---|---|---|
| Calcd | 8.50 | 24.3 |
| Found | 9.07 | 23.0 |

EXAMPLE 3

*1,4-bis-(1-methyl-4-phenyl-azacycloheptane-onium)-tetramethylene dibromide*

A mixture of 0.05 mole (10.7 g.) 4-cyano-1-methyl-4-phenylazacycloheptane and 0.11 mole (4.3 g.) sodamide in 100 ml. of toluene was refluxed while stirring for 6 hours. The cooled mixture was washed with water, then the toluene layer extracted with acid, the acid extract washed with ether, treated with sodium hydroxide and the reaction product extracted with ether. The ether extract was dried, filtered, and distilled. The product, 1-methyl-4-phenyl-azacyclophetane was collected at 88–90° C. (0.25 mm.); $n_D^{29}$ 1.5288.

*Anal.*—Calcd. for $C_{13}H_{19}N$: C, 82.47; H, 10.12; N, 7.40. Found: C, 82.20; H, 10.41; N, 7.51.

1-methyl-4-phenyl-azacycloheptane, 2.0 g. (0.011 mole) and 1,4-dibromobutane, 1.1 g. (0.0050 mole) in 8 ml. of acetonitrile were heated at 82° C. for about 3 hours. White crystals appeared. The mixture was cooled, filtered and washed with acetone-ether on the filter. It was dried overnight. This gave a white solid that melted at 223–25° C.

*Analysis.*—$C_{30}H_{46}N_2Br_2$:

|  | Nitrogen, percent | Bromine, percent |
|---|---|---|
| Calcd | 4.71 | 26.9 |
| Found | 4.39 | 27.5 |

EXAMPLE 4

*1,5-bis-(1-methyl-4-phenyl-azacycloheptane-onium)-pentamethylene dibromide*

1-methyl-4-phenyl-azacycloheptane 2.0 g. (0.011 mole) and 1,5-dibromopentane, 1.2 g. (0.0050 mole) in 8 ml. of benzonitrile were heated at 100° C. for about 3 hours. White crystals appeared after first 5 minutes. After cooling to room temperature, it was treated with acetone with stirring, filtered, and washed on the filter with acetone and ether. This gave a white solid product that was recrystallized from a mixture of acetone and methanol (minimum) and melted at 238°–239° C.

*Analysis.*—$C_{31}H_{48}N_2Br_2$:

|  | Nitrogen, percent | Bromine, percent |
|---|---|---|
| Calcd | 4.61 | 26.3 |
| Found | 4.85 | 26.6 |

EXAMPLE 5

*1,6-bis-(1-methyl-4-phenyl-azacycloheptane-onium)-hexamethylene dibromide and dinitrate*

1-methyl-4-phenyl-azacycloheptane, 1.9 g. (0.010 mole), 1,6-dibromohexane, 1.2 g. (0.0050 mole), and nitrobenzene 3.0 ml., were mixed and heated at 100° C. for 1.5 hours. After cooling, the thick mass was mixed well with acetone to disperse the crystals and filtered. The solid was washed and dried under ether for 4 days. The desired product melted at 200°–202° C.

*Analysis.*—$C_{32}H_{50}N_2Br_2$:

|  | Nitrogen, percent | Bromine, percent |
|---|---|---|
| Calcd | 4.52 | 25.8 |
| Found | 4.64 | 23.9 |

Silver nitrate, 0.55 g. (0.0032 mole), in 10 ml. of distilled water was added dropwise with stirring to 1.0 g. (0.0016 mole) of 1,6-bis-(4-phenyl-1 - methyl - azacycloheptane-onium)-hexamethylene dibromide in 25 ml. of distilled water at room temperature. After stirring 15 minutes more, the mixture was filtered. The water of the clear filtrate was removed under a pressure of 10 mm. and heated with a hot water bath. The residue was made granular by trituration with anhydrous ether, filtered, and dried over $P_2O_5$ at 25° C. (5 mm.). The water soluble product started to melt at 750° C.

Analysis for $C_{32}H_{50}N_4O_6$:

|  | Carbon | Hydrogen | Nitrogen |
|---|---|---|---|
| Calcd | 65.6 | 8.53 | 9.56 |
| Found | 60.7 | 8.15 | 9.35 |

EXAMPLE 6

*1,4-bis-(4-carbethoxy-1-methyl-4-phenyl-azacycloheptane-onium)-tetra-methylene dibromide*

4-carbethoxy-1-methyl-4-phenyl-azacycloheptane, 2.6 g. (0.010 mole), 1,4-dibromobutane, 0.86 g. (0.0040 mole), and nitrobenzene, 8 ml., were mixed and heated at 100° C. for 18 hours. Many crystals. At room temperature it was mixed well with 100 ml. acetone, then filtered. The solid was washed with acetone and then washed and dried under ether. This gave the desired product that melted at 207°–210° C. with decomposition.

*Analysis.*—$C_{36}H_{54}N_2O_4Br_2$:

|  | Nitrogen, percent | Bromine, percent |
|---|---|---|
| Calcd | 3.79 | 21.7 |
| Found | 4.32 | 21.8 |

EXAMPLE 7

*1,5-bis-(4-carbethoxy-4-phenyl-1-methyl-azacycloheptane-onium)-pentamethylene dibromide*

4-carbethoxy-4-phenyl-1-methyl-azacycloheptane, 1.3 g. (0.0050 mole), 1,5-dibromopentane, 0.57 g. (0.0025 mole), and nitrobenzene, 2 ml., were mixed and heated at 80–100° C. for 17 hours. After cooling, the mixture was diluted with 10 ml. of acetone, filtered, and added dropwise with stirring to 200 ml. of dry ether. The granular precipitate was washed by trituration with dry ether, filtered quickly, and dried at 25° C. (5 mm.) over $P_2O_5$. It amounted to 1.6 g. (85%) and started to melt at 85° C.

Analysis.—For $C_{37}H_{56}N_2O_4Br_2$:

| | Nitrogen, percent | Bromine, percent |
|---|---|---|
| Calcd | 3.72 | 21.3 |
| Found | 4.08 | 20.0 |

EXAMPLE 8

*1,6-bis-(4-carbethoxy-1-methyl-4-phenyl-azacycloheptane-onium)-hexamethylene dibromide*

4-carbethoxy-1-methyl-4-phenyl-azacycloheptane, 2.6 g. (0.010 mole), 1,6-dibromohexane, 1.2 g. (0.0050 mole) and nitrobenzene, 5 ml., were mixed and heated for 5 hours at 100° C. The resultant solution was treated with ether (after cooling) in order to precipitate the product which was then triturated well and dried under ether. This gave the desired product that began to melt at 65° C.

Analysis.—$C_{38}H_{58}N_2O_4Br_2$:

| | Nitrogen, percent | Bromine, percent |
|---|---|---|
| Calcd | 3.65 | 20.9 |
| Found | 3.54 | 20.6 |

EXAMPLE 9

*1,7-bis-(4-carbethoxy-1-methyl-4-phenyl-azacycloheptane-onium)-heptamethylene dibromide*

4-carbethoxy-1-methyl-4-phenyl-azacycloheptane, 2.6 g. (0.010 mole), 1,7-dibromoheptane, 1.3 g. (0.0050 mole), and nitrobenzene, 4 ml., were mixed and heated 18 hours at 100° C. After cooling in an ice-bath, the reaction mixture was diluted with 30 ml. of acetone and added dropwise to ether with continuous stirring. The precipitate was washed and dried under ether for 5 days. This gave the product that began to melt at 85° C.

Analysis.—$C_{39}H_{60}N_2O_4Br_2$:

| | Nitrogen, percent | Bromine, percent |
|---|---|---|
| Calcd | 3.59 | 20.5 |
| Found | 3.35 | 19.3 |

EXAMPLE 10

*1,8-bis-(4-carbethoxy-1-methyl-4-phenyl-azacycloheptane-onium)-octamethylene dibromide*

4-carbethoxy-1-methyl-4-phenyl-azacycloheptane, 2.6 g. (0.010 mole), 1,8-dibromo-octane, 1.3 g. (0.0050 mole), and nitrobenzene, 4 ml., were mixed and heated 18 hours at 10° C. After cooling in an ice-bath, the reaction mixture was diluted with 30 ml. of acetone. On standing 30 minutes, crystallization began. By further dilution with acetone (170 ml.) and ice-cooling, more crystals appeared. These were filtered off and dried under ether. More product was obtained by concentration of the mother liquor and addition to ether. The product began to melt at 150° C. This could be recrystallized from a nitrobenzene-acetone mixture.

Analysis.—$C_{40}H_{62}N_2O_4Br_2$:

| | Nitrogen, percent | Bromine, percent |
|---|---|---|
| Calcd | 3.52 | 20.1 |
| Found | 3.50 | 18.3 |

EXAMPLE 11

*1,10-bis-(4-carbethoxy-1-methyl-4-azacycloheptane-onium)-decamethylene diiodide*

4-carbethoxy-1-methyl-4-phenyl-azacycloheptane, 2.9 g. (0.011 mole), 1,10-diiododecane, 2.0 g. (0.0050 mole), and nitrobenzene, 5 ml., were mixed together and heated 15 hours at 100° C. After cooling down to 5° C. and mixing well with acetone some crystallization began. But after cooling down with a Dry-Ice and acetone bath and adding dry ether gradually, the main body of the product came out of solution at a faster rate. It was filtered off, washed with ether, and then reprecipitated by adding its solution in acetone-methanol (minimum) dropwise to stirred ether. The product melted at 190–195° C.

Analysis.—$C_{42}H_{66}N_2O_4I_2$:

| | Nitrogen, percent | Iodine, percent |
|---|---|---|
| Calcd | 3.06 | 27.7 |
| Found | 2.84 | 26.5 |

EXAMPLE 12

*1,4-bis-(4-cyano-1,2-dimethyl-4-phenyl-azacycloheptane-onium)-tetramethylene dibromide*

To a solution of 1.43 moles (167.6 g.) of phenylacetonitrile in 250 ml. of toluene was added 1.29 mole (50.3 g.) of sodamide at such a rate as to maintain the temperature at 35–40°. The addition was effected under a nitrogen atmosphere with stirring. After an additional 2 hours at 35–40°, the mixture was cooled to 5°. A dry toluene solution of 1-dimethylamino-2-chloropropane, prepared the same day from 1.23 moles (193 g.) of the hydrochloride and 1.37 moles (54.6 g.) of sodium hydroxide in 500 ml. of water and 250 ml. of toluene, was then added dropwise at 5–10°. This temperature was maintained an additional hour, then it was allowed to rise to room temperature and stand overnight. The mixture was washed with water, extracted with 6 N-hydrochloric acid, the acid extract washed with ether, basified, and extracted with ether. The ether extract was dried, filtered, and distilled. A mixture of the isomers of the butyronitriles boiled at 95–8° (0.2 mm.), $n_D^{28}$ 1.5028.

To a stirred solution of 0.85 mole (172.8 g.) of a mixture containing 4-dimethylamino-3- and 4-methyl-2-phenyl-n-butyronitrile in 1.2 l. of toluene under a nitrogen atmosphere, was added portionwise 1.09 mole (42.6 g.), of sodamide. The rate of addition was controlled so as to maintain the temperature at 35–40°. This temperature was kept an additional 2 hours. The red solution was cooled to −30° in a Dry Ice-acetone bath, and 0.898 mole (141.3 g.) of trimethylene chlorobromide in 250 ml. of toluene was added at such a rate as to maintain the temperature between −25° and −15°. This temperature was maintained an additional ½ hour, then the stirred mixture was allowed to warm to room temperature and stand overnight. The mixture was filtered and the toluene distilled from the filtrate at 30–35° (35 mm.). The liquid residue contained a mixture of the 1- and 2-methyl chlorhexanes.

Liquid residue from the proceding step was diluted to 850 ml. with nitrobenzene and the resulting solution heated at 100° for 17 hours to precipitate the quaternary salt. The cooled mixture was filtered and the precipitate washed several times with acetone to give essentially pure 2-methyl quaternary salt, M. P. 251–251.5° dec. Recrystallization from ethanol gave fine white crystals, M. P. 259° dec.

*Anal.*—Calcd. for $C_{16}H_{23}ClN_2$: C, 69.00; H, 8.32; N, 10.05; Cl, 12.70. Found: C, 68.46; H, 8.73; N, 10.29; Cl, 12.14.

The filtrate from the quaternary salt contained the 2-methyl chlorhexane unchanged.

0.378 mole (105.7 g.) of the 2-methyl quaternary was suspended in 378 ml. of undecanol (B. P. 225°). The mixture was heated to its reflux temperature with stirring, whereupon the solid dissolved with evolution of methyl chloride gas. The stirring and refluxing was continued until the evolution of gas was negligible. The solution was cooled under nitrogen and extracted with 6 N-hydrochloric acid. The acid extract was washed with ether, basified, extracted with ether, the ether extract dried, filtered, and the solvent removed.

Distillation of the liquid residue gave the 2-methyl cyano base, B. P. 123–6° (0.2 mm.), $n_D^{27}$ 1.5341, $d_4^{27}$ 1.019.

*Anal.*—Calcd. for $C_{15}H_{20}N_2$: C, 78.90; H, 8.83; $M_D$69.54. Found: C, 78.50; H, 8.78; $M_D$69.40.

4-cyano-1,2-dimethyl-4-phenyl-azacycloheptane, 2.3 g. (0.010 mole), 1,4-dibromobutane, 0.86 g. (0.004 mole), and nitrobenzene, 7.5 ml., were mixed and heated 23 hours at 100° C. Crystals appeared. At room temperature, 50 ml. of dry ether was added with good stirring, the mixture was filtered, and the solid was washed with acetone and then ether by trituration. After drying, there was obtained the desired product that began to melt at 200° C.

*Analysis.*—$C_{33}H_{46}N_4Br_2$:

|  | Nitrogen, percent | Bromine, percent |
|---|---|---|
| Calcd | 8.50 | 24.3 |
| Found | 7.34 | 21.6 |

EXAMPLE 13

*1,5-bis-(4-cyano-1,2-dimethyl-4-phenyl-azacycloheptane-onium)-pentamethylene dibromide*

4-cyano-1,2-dimethyl-4-phenyl-azacycloheptane, 2.3 g. (0.010 mole), 1,5-dibromopentane, 0.92 g. (0.0040 mole), and nitrobenzene, 7.5 ml., were mixed and heated 23 hours at 100° C. No crystals. At room temperature, 50 ml. of ether was added gradually with good stirring to precipitate the product which was then reprecipitated from acetone-methanol (minimum) with ether and finally dried under ether. The product started to melt at 100° C.

*Analysis.*—$C_{34}H_{48}N_4Br_2$:

|  | Nitrogen, percent | Bromine, percent |
|---|---|---|
| Calcd | 8.32 | 23.8 |
| Found | 6.96 | 21.1 |

EXAMPLE 14

*1,4-bis-(1,2-dimethyl-4-phenyl-azacycloheptane-onium)-tetra-methylene dibromide*

In the same manner as taught in Example 3, and starting with 0.05 mole (11.4 g.) of 4-cyano-1,2-dimethyl-4-phenyl-azacycloheptane, one may obtain the free base 1,2-dimethyl-4-phenylazacycloheptane, B. P. 106°–108° C. (0.2 mm.), $n_D^{27}$ 1.5255.

*Anal.*—Calcd. for $C_{14}H_{21}N$: C, 82.65; H, 10.40; N, 6.88. Found: C, 82.25; H, 10.35; N, 6.66.

1,2-dimethyl-4-phenyl-azacycloheptane, 2.0 g. (0.010 mole), 1,4-dibromobutane, 1.1 g. (0.0050 mole), and nitrobenzene, 3 ml., were mixed and heated 20 hours at 100° C. The crystalline mass was cooled down to room temperature, mixed with acetone, and filtered. The solid was washed and dried under ether. The product started to melt at 80° C.

*Analysis.*—$C_{32}H_{50}N_2Br_2$:

|  | Nitrogen, percent | Bromine, percent |
|---|---|---|
| Calcd | 4.51 | 25.8 |
| Found | 4.57 | 23.3 |

EXAMPLE 15

*1,5-bis-(1,2-dimethyl-4-phenyl-azacycloheptane-onium)-penta-methylene dibromide*

1,2-dimethyl-4-phenyl-azacycloheptane, 2.0 g. (0.010 mole), 1,5-dibromopentane, 1.2 g. (0.0050 mole), and nitrobenzene, 3 ml., were mixed and heated 20 hours at 100° C. The solution that resulted was cooled to 25° C. and diluted with acetone. By adding a large volume of ether to this, the product was precipitated. After washing and drying with ether, the desired product started to melt at 75° C.

*Analysis.*—$C_{33}H_{52}N_2Br_2$:

|  | Nitrogen, percent | Bromine, percent |
|---|---|---|
| Calcd | 4.41 | 25.2 |
| Found | 4.34 | 21.9 |

EXAMPLE 16

*1,4-bis-(1,3-dimethyl-4-phenyl-azacycloheptane-onium)-tetra-methylene dibromide*

Following the procedure of Example 3, and starting with 0.05 mole (11.4 g.) 4-cyano-1,3-dimethyl-4-phenyl-azacycloheptane, the product obtained is 1,3-dimethyl-4-phenylazacycloheptane, B. P. 98°–100° C. (0.25 mm.), $n_D^{31}$ 1.5251.

*Anal.*—Calcd. for $C_{14}H_{21}N$: C, 82.65; H, 10.40; N, 6.88. Found: C, 82.06; H, 10.35; N, 6.60.

1,3-dimethyl-4-phenyl-azacycloheptane, 2.1 g. (0.010 mole) 1,4-dibromobutane, 0.86 g. (0.0040 mole), and nitrobenzene, 5 ml. were mixed and heated 21 hours at 100° C. After cooling the crystalline mass to 25° C., it was mixed with a large volume of acetone and allowed to stand 16 hours. It was then filtered, and the solid was washed and dried under ether. The product melted at 216–218° C. with decomposition.

*Analysis.*—$C_{32}H_{50}N_2Br_2$:

|  | Nitrogen, percent | Bromine, percent |
|---|---|---|
| Calcd | 4.50 | 25.7 |
| Found | 4.24 | 25.8 |

EXAMPLE 17

*1,5-bis-(1,3-dimethyl-4-phenyl-azacycloheptane-onium)-penta-methylene dibromide and sulfate*

1,3-dimethyl-4-phenyl-azacycloheptane, 2.1 g. (0.010 mole), 1,5-dibromopentane, 0.92 g. (0.0040 mole), and nitrobenzene, 5 ml., were mixed and heated 21 hours at 100° C. After cooling the crystalline mass to 25° C., it was mixed with a large volume of acetone and allowed to stand overnight. It was then filtered, and the solid was washed and dried under ether. The dibromide melted at 213–215° C. with decomposition.

*Analysis.*—$C_{33}H_{52}N_2Br_2$:

|  | Nitrogen, percent | Bromine, percent |
|---|---|---|
| Calcd | 4.41 | 25.2 |
| Found | 4.24 | 25.0 |

Silver sulfate, 0.31 g. (0.0010 mole), in 75 ml. of warm distilled water was added dropwise with stirring to 0.65 g. (0.0010 mole) of 1,5-bis-(1,3-dimethyl-4-phenyl-azacycloheptane-onium)-pentamethylene dibromide in 20 ml. of distilled water at room temperature. After stirring 15 minutes more, the mixture was filtered. The water of the clear filtrate was removed under a pressure of 10 mm. and heated with a hot water bath. The residue was dissolved in an acetone-methanol mixture, filtered through carbon black, and the clear filtrate added dropwise with stirring to a large volume of ether. The precipitate was made granular by trituration with dry ether. After filtering and drying over $P_2O_5$ at 25° C. (5 mm.), the water-soluble sulfate salt was obtained which started to melt at 70° C.

Analysis for $C_{33}H_{52}N_2O_4S$:

|  | Carbon | Hydrogen | Nitrogen | Sulfur |
|---|---|---|---|---|
| Calcd | 69.3 | 9.16 | 4.90 | 5.60 |
| Found | 65.9 | 9.37 | 4.35 | 4.91 |

EXAMPLE 18

*1,6-bis-(1,2-dimethyl-4-phenyl-azacycloheptane-onium)-hexamethylene dibromide*

1,2-dimethyl-4-phenyl-azacycloheptane, 1.6 g. (0.0080 mole), 1,6-dibromohexane, 0.97 g. (0.0040 mole), and nitrobenzene, 2.5 ml., were mixed and heated 17 hours at 100° C. After cooling down to room temperature it was stirred and treated with 50 ml. of acetone to give a gummy precipitate. After decanting the supernatant solution, the gum was washed with acetone, dissolved in acetone-methanol (minimum), filtered through carbon-black, and added dropwise with stirring to 200 ml. of dry ether. The solid precipitate was triturated with and dried under ether. This gave the desired product that began to melt at 95° C.

*Analysis.*—$C_{34}H_{54}N_2Br_2$:

|  | Nitrogen, percent | Bromine, percent |
|---|---|---|
| Calcd | 4.31 | 24.6 |
| Found | 4.93 | 24.3 |

EXAMPLE 19

*1,4-bis-(4-carbethoxy-1-methyl-4-phenyl-azacycloheptane-onium)-1-methyl-tetramethylene dibromide*

4-carbethoxy-1-methyl-4-phenyl-azacycloheptane, 2.6 g. (0.010 mole), 1,4-dibromopentane, 1.1 g. (0.0050 mole), and nitrobenzene, 4.0 ml., were mixed and heated 20 hours at 90–100° C. After cooling down to room temperature, it was diluted with 25 ml. of acetone. The clear yellow solution was added dropwise with stirring to 200 ml. of anhydrous ether over a period of 2 hours to precipitate a solid product. The supernatant solution was decanted, and the yellow solid was washed and dried under ether for 2 days. After drying at 25° C. (5 mm.) over $P_2O_5$ the product obtained began to melt at 70° C.

*Analysis.*—$C_{37}H_{56}N_2O_4Br_2$:

|  | Nitrogen, percent | Bromine, percent |
|---|---|---|
| Calcd | 3.73 | 21.3 |
| Found | 4.37 | 21.1 |

EXAMPLE 20

*1,9-bis-(4-carbethoxy-1-methyl-4-phenyl-azacycloheptane-onium)-nonamethylene dibromide*

4-carbethoxy-1-methyl-4-phenyl-azacycloheptane, 1.3 g. (0.0050 mole), nonamethylene dibromide, 0.70 g. (0.0025 mole), and nitrobenzene, 2.0 ml., were mixed and heated 20 hours at 80–100° C. After cooling down to room temperature, it was diluted with acetone, filtered, and the clear filtrate added dropwise with good stirring to a large volume of dry ether. The white precipitate was washed well with ether by trituration and dried over $P_2O_5$. The product started to melt at 140° C.

Analysis for $C_{41}H_{64}Br_2N_2O_4$:

|  | Nitrogen, percent | Bromine, percent |
|---|---|---|
| Calcd | 3.46 | 19.8 |
| Found | 3.60 | 18.7 |

We claim:

1. A quaternary ammonium salt containing the cation

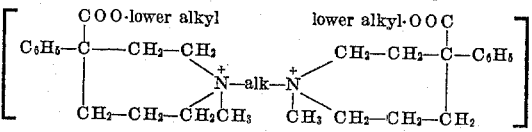

wherein "alk" stands for an alkylene radical of 6 to 10 carbon atoms.

2. The compound, 1,6-bis-(4-carbethoxy-1-methyl-4-phenyl-azacycloheptane-onium)-hexamethylene dihalide.
3. The compound, 1,7-bis1(4-carbethoxy-1-methyl-4-phenyl-azacycloheptane-onium)-heptamethylene dihalide.
4. The compound, 1,8-bis-(4-carbethoxy-1-methyl-4-phenyl-azacycloheptane-onium)-octamethylene dihalide.
5. The compound, 1,9-bis-(4-carbethoxy-1-methyl-4-phenyl-azacycloheptane-onium)-nonamethylene dihalide.
6. The compound, 1,10-bis-(4-carbethoxy-1-methyl-4-phenyl-azacycloheptane-onium)-decamethylene dihalide.
7. The process comprising dissolving in an inert highly polar organic solvent an azacycloheptane reactant having the formula

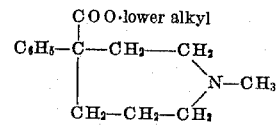

and an alkylene dihalide reactant having from 6 to 10 carbon atoms, said solvent having a boiling point above about 70° C. and a dipole moment of at least about 2.5 Debye units, heating the reactants to a temperature in the range of about 70° to about 100° C. thereby forming as a desired product a quaternary ammonium salt containing the cation

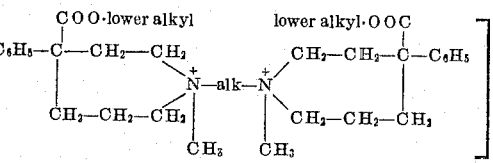

wherein "alk" stands for an alkyleen radical of 6 to 10 carbon atoms.

8. The process of claim 7, wherein the reaction products are commingled with a relatively non-polar solvent thereby precipitating the desired product.
9. The process of claim 8, wherein the reaction products are gradually added to said relatively non-polar solvent.

References Cited in the file of this patent

UNITED STATES PATENTS

| 2,666,050 | Diamond et al. | Jan. 12, 1954 |
| 2,667,493 | Slack et al. | Jan. 26, 1954 |

OTHER REFERENCES

MacArdle: "Use of Solvents in Synthetic Org. Chem." (Van Nostrand) pp. 151–5 (1925).

Collier et al.; Nature, vol. 164, pp. 491–2 (1949).

Jones, Chem. Abst., vol. 45, col. 619 (1951).